(12) United States Patent
Alassadi

(10) Patent No.: US 10,918,028 B1
(45) Date of Patent: Feb. 16, 2021

(54) IRRIGATION AND FERTILIZER DEVICE

(71) Applicant: Faris Mohammed-Ali Alassadi, Ann Arbor, MI (US)

(72) Inventor: Faris Mohammed-Ali Alassadi, Ann Arbor, MI (US)

(73) Assignee: Faris Alassadi, Ann Arbor, MI (US)

( * ) Notice: Subject to any disclaimer, the term of this patent is extended or adjusted under 35 U.S.C. 154(b) by 0 days.

(21) Appl. No.: 16/109,845

(22) Filed: Aug. 23, 2018

(51) Int. Cl.
*A01G 25/02* (2006.01)

(52) U.S. Cl.
CPC ................................. *A01G 25/02* (2013.01)

(58) Field of Classification Search
CPC ........ A01G 25/00; A01G 25/02; A01G 25/16; A01G 27/00; A01G 27/02
See application file for complete search history.

(56) References Cited

U.S. PATENT DOCUMENTS

| | | | | | |
|---|---|---|---|---|---|
| 612,745 | A | * | 10/1898 | Morris | A01M 21/043 111/7.2 |
| 1,512,758 | A | * | 10/1924 | Gravatt | A01G 29/00 111/7.2 |
| 1,540,660 | A | * | 6/1925 | Snow | A01M 17/002 43/124 |
| 2,016,983 | A | * | 10/1935 | Bruce | A01G 29/00 111/7.1 |
| 2,065,678 | A | * | 12/1936 | Fish, Jr. | A01G 29/00 111/96 |
| 2,173,966 | A | * | 9/1939 | Jackson | A01M 21/043 111/7.2 |
| 2,242,789 | A | * | 5/1941 | McFee | A01G 29/00 111/7.1 |
| 2,335,182 | A | * | 11/1943 | Hill | A01M 21/043 111/7.2 |
| 2,885,977 | A | * | 5/1959 | Fabus | A01G 29/00 111/7.1 |

(Continued)

FOREIGN PATENT DOCUMENTS

| GB | 2170688 A | * | 8/1986 | ............. A01G 31/06 |
|---|---|---|---|---|
| GB | 2179834 A | * | 3/1987 | ............. A01G 9/122 |

*Primary Examiner* — Son T Nguyen

(57) ABSTRACT

A plant irrigation system and method of use, wherein the system accepts a fluid and releases it over time to one or more plants. The improved design has the following modifications:
The float valve has been re-located to inside the stake to allow the valve to be more stabilized.
The outlet valve at the bottom of the container has been relocated so the water exits from the stake via the flexible outlet irrigation tube rather than a valve that was at the bottom of the container.
The Inlet flow tubs has been relocated so that it feeds water directly into the stake as opposed to feeding it into an inlet in the container. The fluid that is released through the valves attached to the flexible outlet irrigation tube will be released with stronger pressure. The system can be fed manually or via an irrigation network capable of feeding fluid to one or more containers. Fluid flow into each individual container is controlled via a float valve or level switch. Fluid exits the container and waters the plants through the flexible outlet irrigation tube with two or more adjustable valves, regulating the flow rate out of the container. The containers are above the ground, each mounted upon a stake, and utilize a flexible impermeable membrane.

6 Claims, 7 Drawing Sheets

(56) References Cited

U.S. PATENT DOCUMENTS

| | | | | |
|---|---|---|---|---|
| 3,125,255 A * | 3/1964 | Kaiser | A01G 9/00 222/189.06 |
| 3,195,818 A * | 7/1965 | Herberg | B05B 1/20 239/276 |
| 3,299,842 A * | 1/1967 | Bingham | A01M 21/043 111/7.2 |
| 3,405,669 A * | 10/1968 | Nimrick | A01G 27/008 111/7.2 |
| 3,438,575 A * | 4/1969 | Rohling | A01G 27/003 239/1 |
| 3,711,992 A * | 1/1973 | Martin | A01G 29/00 47/48.5 |
| 3,856,205 A * | 12/1974 | Rohling | A01G 27/006 239/63 |
| 4,291,836 A * | 9/1981 | Chen-Hsiung | A01G 27/001 137/132 |
| 4,578,897 A * | 4/1986 | Pazar | A01G 27/006 239/63 |
| 4,624,194 A * | 11/1986 | Zinck | A01B 79/00 111/7.2 |
| 4,704,818 A * | 11/1987 | Cameron | A01G 9/022 47/48.5 |
| 5,067,272 A * | 11/1991 | Constantz | A01G 25/00 202/234 |
| D333,763 S * | 3/1993 | Collins | D23/200 |
| 5,201,860 A * | 4/1993 | Richardson | A01G 29/00 47/39 |
| 5,301,633 A * | 4/1994 | Lloyd | A01K 67/0332 119/6.7 |
| 5,558,030 A * | 9/1996 | Ward | A01C 23/026 111/7.2 |
| 6,659,366 B1 * | 12/2003 | Walters | B05B 9/0838 222/206 |
| 2004/0206771 A1 * | 10/2004 | Junkel | F41B 9/0009 222/78 |
| 2007/0267515 A1 * | 11/2007 | Sargent | A01G 27/003 239/63 |
| 2008/0092440 A1 * | 4/2008 | Johnson | A01G 13/0212 47/48.5 |

* cited by examiner

IRRIGATION AND FERTILIZER DEVICE

TECHNICAL FIELD

This technology relates to irrigation systems. More specifically, the disclosure describes an irrigation system for plants.

BACKGROUND

The statements in this section merely provide background information related to the present disclosure. Accordingly, such statements are not intended to constitute an admission of prior art.

This drip irrigation device fills the need to use water more efficiently and eliminates wasting water any place, but it is especially useful in areas where water is scarce. This device can be used n any terrain and on any kind of soil. You can direct the water to a specific area. You can set it to drip slowly c to release the water more quickly. You have the option of adding fertilizer to the water. The way the device is built allows the user to have the ability to add and control the amount of fertilizer desired. Liquid fertilizer and other soluble fertilizers can be added to the system and mix with the water that is dispensed from the device. The new drip irrigation device is light weight and easy to set up and move. You can set it up and go about your business.

BRIEF SUMMARY OF THE INVENTION

The present disclosure describes a plant irrigation system, the system comprising one or more device(s), wherein each device comprises: a container; a hollow stake (that is blocked in the bottom portion, below the outlet flow tube, to prevent fluid from draining into the bottom portion of the stake) configured to be inserted into a surface, wherein ti e stake passes through a top of the container and a bottom of the container; a top retaining clip which attaches the stake to the top of the container; a bottom retaining dip which attaches the stake to the bottom of the container; a flexible outlet irrigation tube attached to the stake by a connector, under the bottom retaining clip on the container and; an inlet opening attached to a top area of the container and an inlet flow tube attached to the top area of the stake.

A method for watering a plant, the method comprises: inserting a stake of a device into a ground area near a plant, wherein the device comprises: a container the stake, wherein the stake pauses through a top of the container and a bottom of the container; a top retaining dip which attaches the stake to the top of the container; a bottom retaining clip which attaches the stake to the bottom of the container a flexible outlet irrigation tube attached to the stake by a connector, under the bottom retaining dip on the container and an inlet opening attached to a top urea of the container; and an inlet flow tube attached to the top area of the stake by a connector; filling the container with liquid via the inlet opening; or filling the container via the flexible inlet flow tube and releasing water from the container onto the ground area via the valves of the flexible outlet irrigation tube.

In one embodiment, the device(s) further comprise a flow tube attached to the top area of the stake and configured to allow fluid to flow into the container through an opening in the stake.

In one embodiment, the device(s) further comprise a float valve inside the stake wherein the float valve is configured to restrict fluid flow into the container coming from the flow tube.

In one embodiment, the float valve comprises a ball, a ball guide and the ball base configured to float upon a fluid surface within the stake and plug the flow opening when the fluid surface nears the flow opening.

In one embodiment, there is more than one device and each device is independently attached to a fluid flow network configured to add fluid to each device.

In one embodiment, the container comprises a flexible impermeable membrane.

In one embodiment, the membrane is elastic.

The container can be a bag with a plastic material of construction.

The stake can be inserted into soil or the ground. The stake is a hollow pipe which contains the ball valve. The bottom portion of the stake is blocked in order to prevent water from flowing downward inside the stake. More importantly, the blockage also serves to direct the water or fluid into the flexible outlet tube with valves to release the water for irrigating. As the device fills with fluid the float valve that k located in the upper portion of the stake will be forced upward and will plug the flow of incoming fluid.

There is a small opening in a portion of the stake located inside the container above the bottom retaining clips that allows fluid to flow back and forth between the stake and the container.

The outlet valves can be manually operated and manually adjusted to regulate the flow rate of fluid onto the ground.

The inlet opening allows easy filling of the container via a hose or other fluid filling options.

The retaining clips can be metal, elastic, plastic, or the like. The retaining clips attach the container to the stake with enough force to prevent fluid leaking from the container.

The scope it of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

A clear understanding of the key features of the invention summarized above may be had by reference to the appended drawings, which illustrate the method and system of the invention, although it will be understood that such drawing s depict preferred embodiments of the invention and, therefore, are not to be considered as limiting its scope with regard to other embodiments which the invention is capable of contemplating. Accordingly.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Each device in the present disclosure also utilizes a container that is a flexible membrane such as a bag. The membrane can be elastic.

Figure 1:
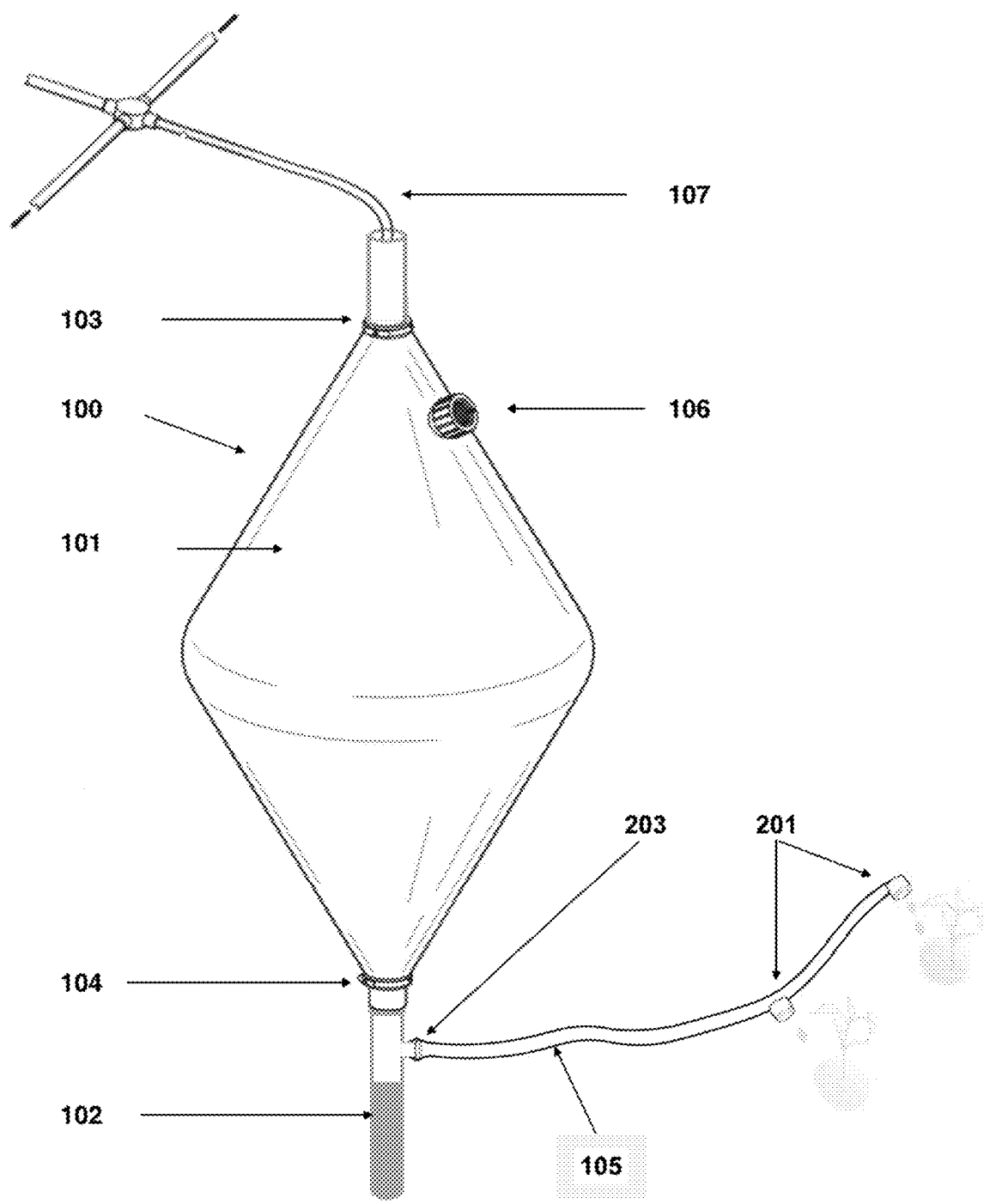
FIG. 1 shows a perspective view of a plant irrigation system embodiment.

FIG. 1 shows a perspective view of a plant irrigation system embodiment. Shown are a plant irrigation device 100, container 101, stake 102, top retaining clip 103, a bottom retaining clip 104 flexible outlet irrigation tube 105 with on connector 203 and two adjustable valves 201, inlet opening 106, inlet flow tube 107. Water is released to the ground area via the valves attached to the flexible outlet irrigation tube 105. The flow rate of the water coming out of the valves 201 can be manually adjusted to release between 0-to-two gallons per hour. In a separate embodiment, the flow rate of the water coming out of the valves 201 can be manually adjusted and can range from one gallon per fifteen minutes (completely open) to one gallon per three hours from each valve.

Figure 2:
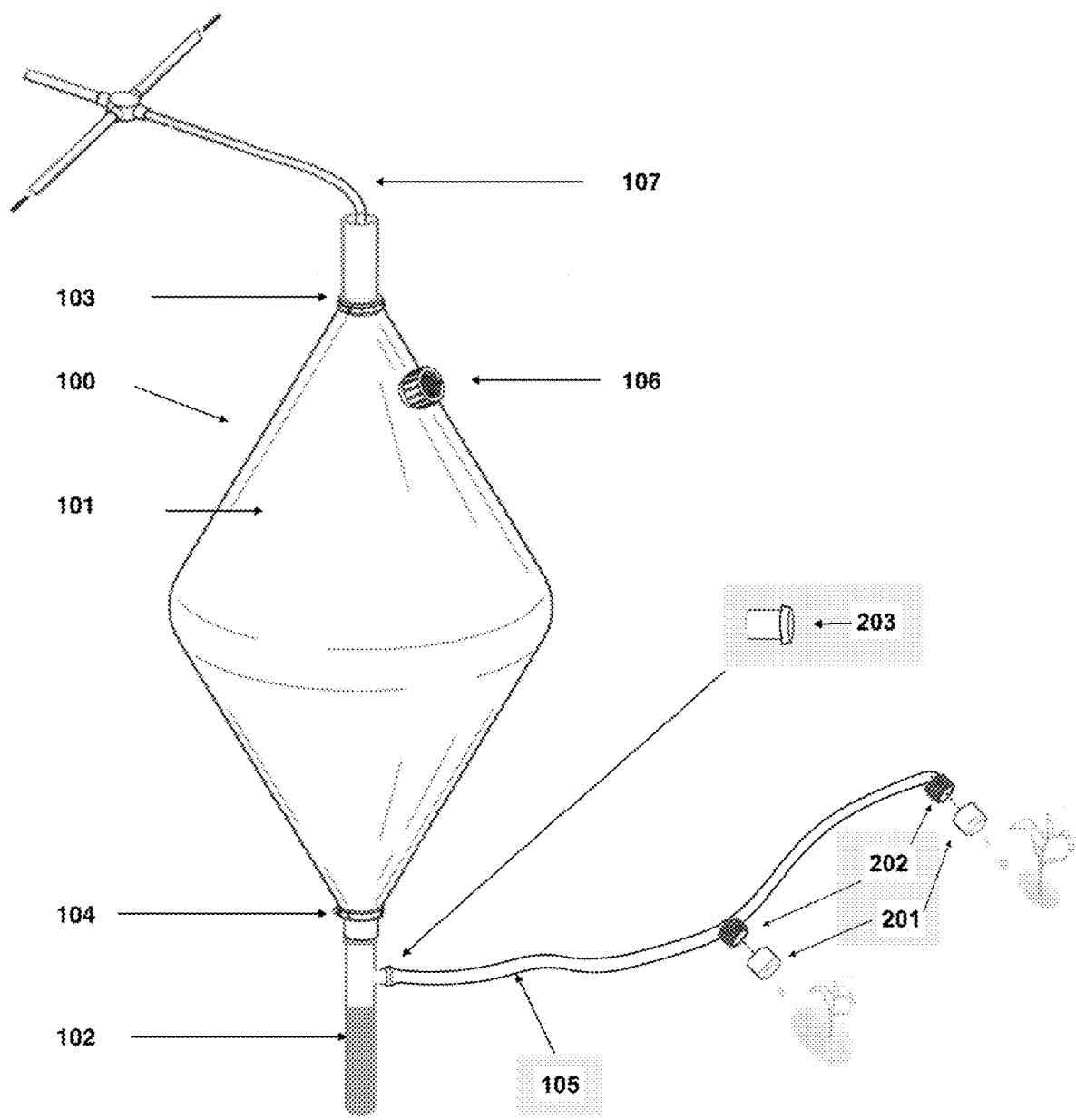
FIG. 2 shows a perspective view of a plant irrigation system embodiment with the two valves and the connector.

FIG. 2 shows a perspective view of a plant irrigation system embodiment. Shown are a plant irrigation device 100, container 101, stake 102, top retaining clip 103, a bottom retaining dip 104, flexible outlet irrigation tube 105, connector 203, two adjustable valves 201, inlet opening 106, inlet flow tube 107. The two adjustable valves 201 are adjusted on the threaded opening 202 to regulate the flow rate of fluid out of the device 100 through the flexible outlet irrigation tube 105. The stake 102 is inserted into the ground near a plant(s). Water can enter the container either through the inlet flow tube 107 or through the inlet opening 106.

Figure 3:
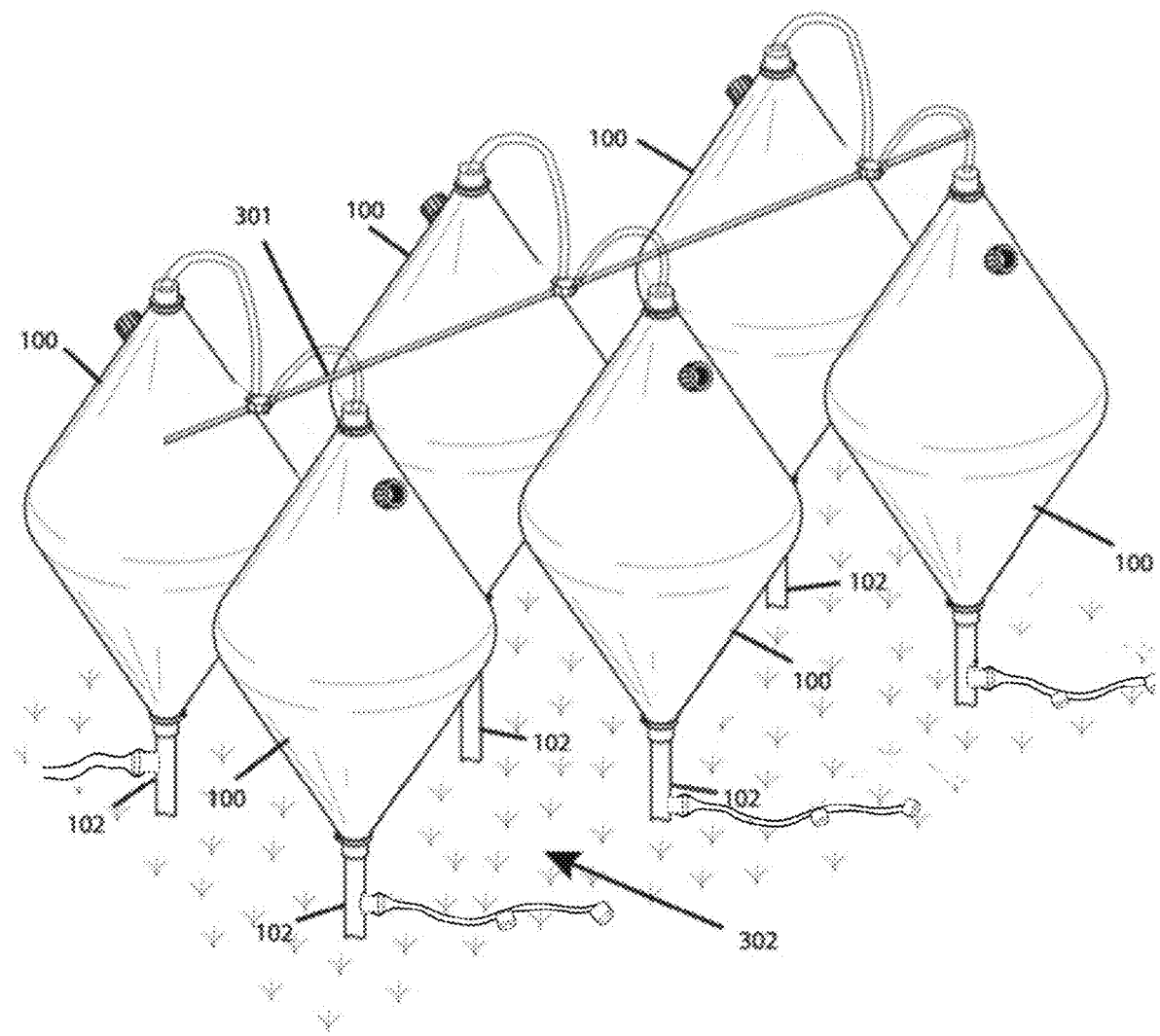
FIG. 3 shows a perspective view of a plant irrigation system embodiment wherein the system is expanded and configured to water multiple plants.

FIG. 3 shows a perspective view of a plant irrigation system embodiment wherein the system is expanded and configured to water multiple plants. Shown are multiple plant irrigation devices 100 (six of them) connected via fluid flow network 301. The stakes 102 of each device 100 are inserted into the ground area 302.

Figure 4:
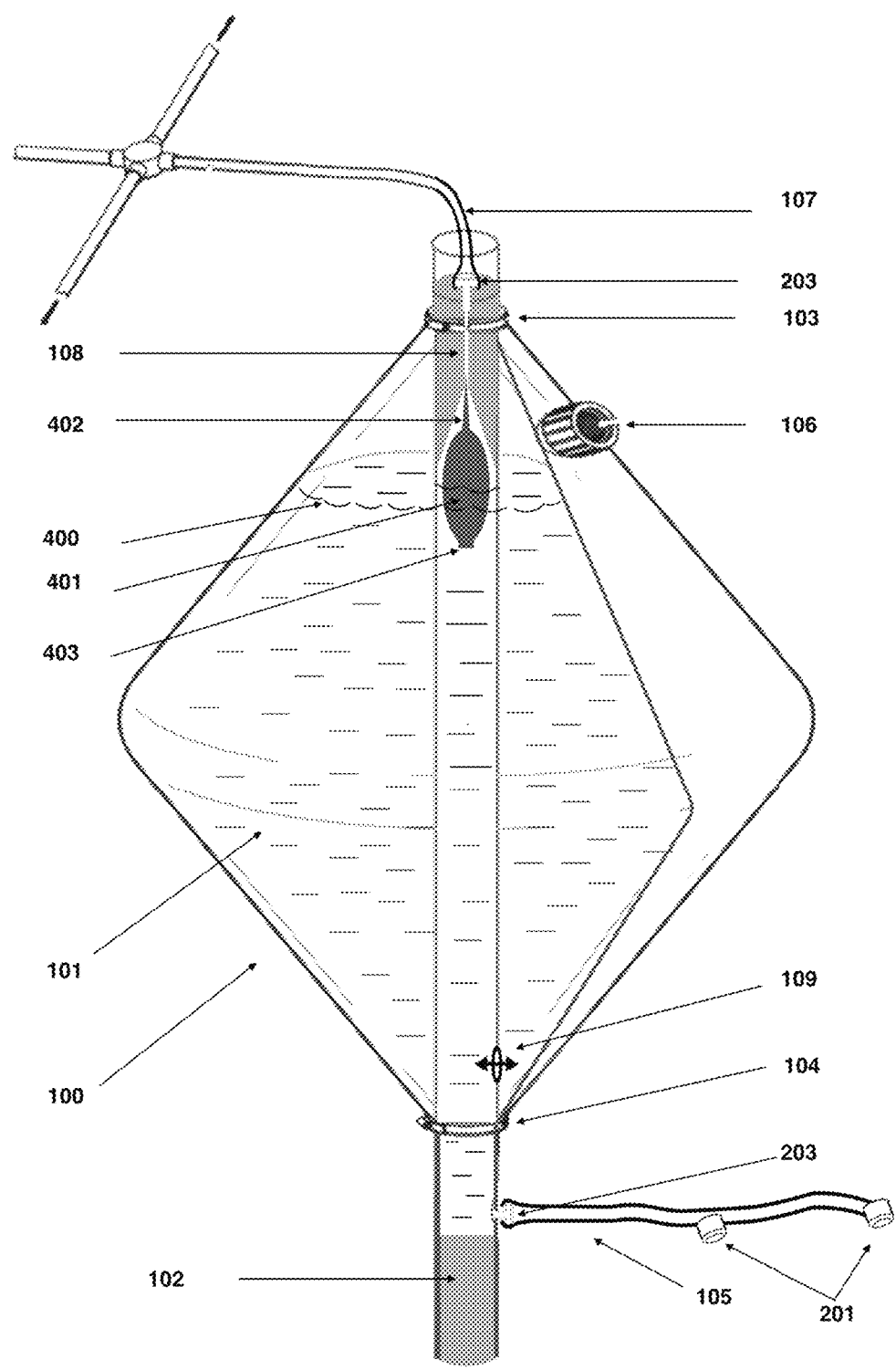
FIG. 4 shows a perspective cut-away view of a plant irrigation system embodiment with the system filled with a liquid.

FIG. 4 shows a perspective cut-away view of a plant irrigation system embodiment with the system mostly-filled with n liquid. Shown are a plant irrigation device 100, container 101, stake 102, top retaining clip 103, a bottom retaining dip 104, flexible outlet irrigation tube 105 with two adjustable values 201, inlet opening 106, inlet flow tube 107, inlet fluid receiver 108, stake hole (opening) 109, two connectors 203, fluid surface 400 and ball valve 401, ball guide 402, and the ball base 403. The ball valve 401, 402, 403 rests on the fluid surface 400 and restricts the flow from the inlet flow tube 107 when the water fills the container to the top. There are two options for filling the container 101. Fluid can enter through inlet flow tube 107 or through inlet opening 106. When using inlet flow tube 107 the fluid flows through the stake and is released into the container 101 through the stake hole (opening) 109. When using the inlet opening 106 the fluid flows into the container 101 and then the fluid enters into the stake 102 via the stake hole (opening) 109. Either option results in the ball valve 401, ball guide 402 and ball base 403 floating to the top of the water surface. Fluid flow into the container 101 will be restricted by the t all guide 402 utilizing the buoyant pressure of the fluid within the container. Note that the ball guide 402 and the inlet flow tube receiver 108 have a matching shape to facilitate easier seating of the ball valve 401 into the inlet flow receiver 106. Also note that a flexible membrane material of construction is used for container 101 and that the membrane is tapered from the fluid surface 400 to the top retaining dip 103.

Figure 5:
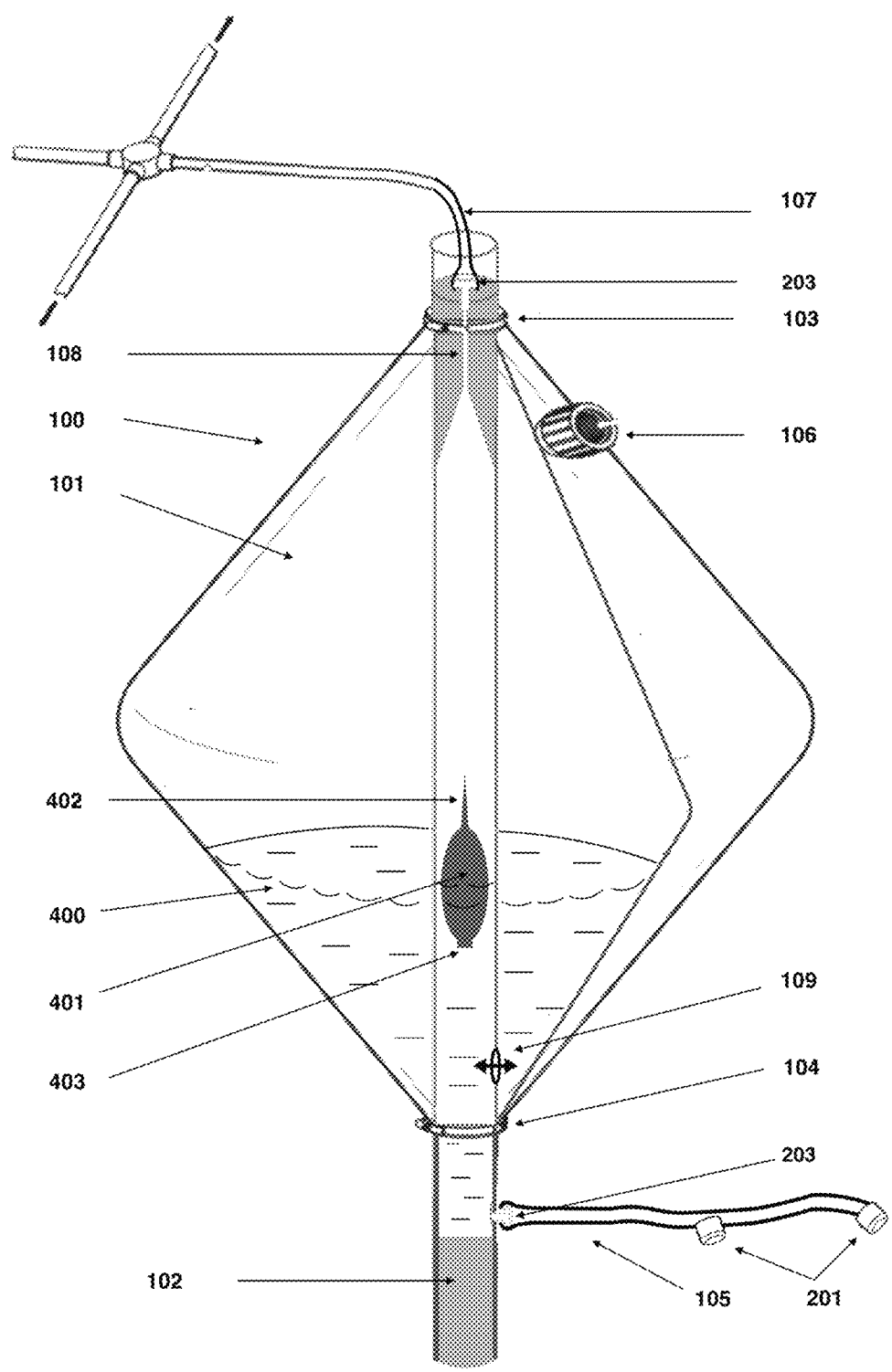
FIG. 5 shows a perspective cut-away view of a plant irrigation system embodiment with the system partially-filled with a liquid.

FIG. 5 shows a perspective cut-away view of a plant irrigation system embodiment with the system slightly-filled with a liquid. Shown are a plant irrigation device 100, container 101, stake 102, top retaining clip 103, a bottom retaining dip 104, flexible outlet irrigation tube 105 with two adjustable valves 201, inlet opening 106, inlet flow tube 107, inlet fluid receiver 108, stake hole (opening) 109, two connectors 203, fluid surface 400 and ball 401 and ball guide 402, and the ball base 403.

Figure 6:
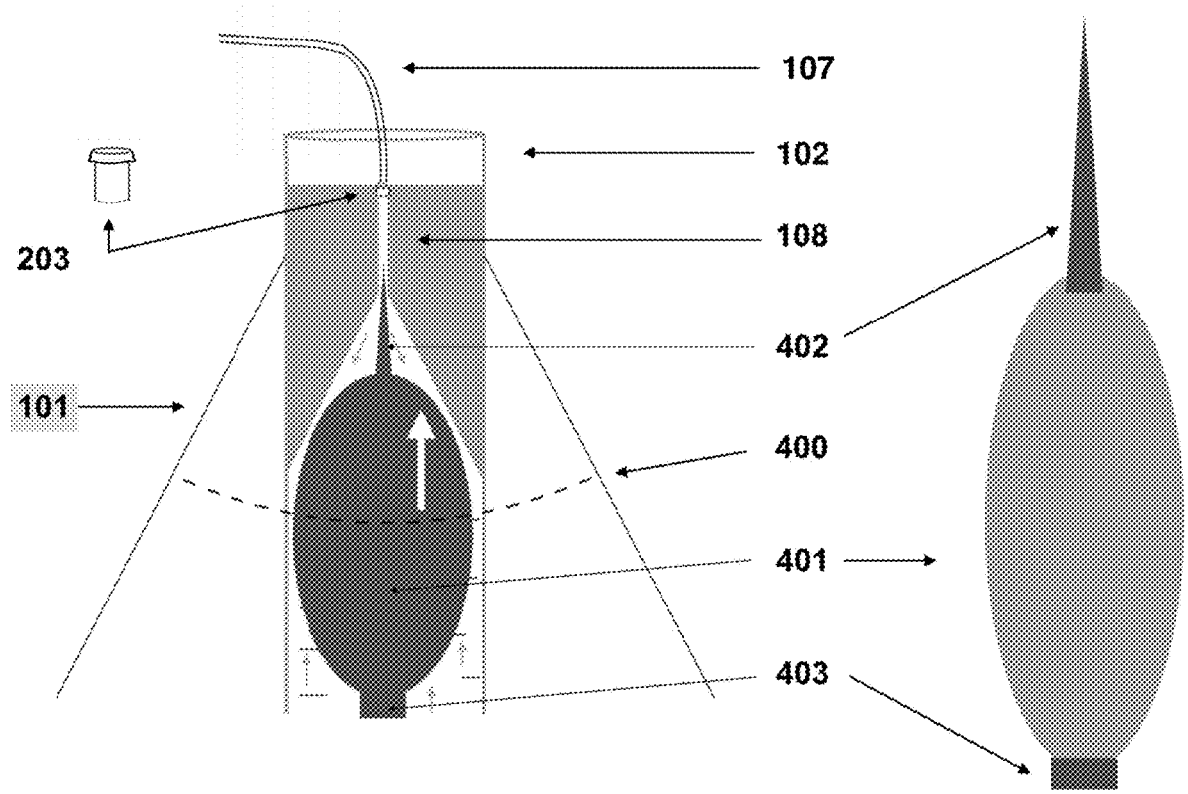
FIG. 6 shows a perspective cut-away view of a plant irrigation system embodiment with the valve inside the stake.

FIG. 6 shows a perspective cut away view of a ball valve 401, the ball valve guide 402 and the ball valve base 403. The ball valve 401, the ball valve guide 402 and the ball valve base 403 help to control the amount of fluid allowed into the stake 102. When fluid is entering the container from the inlet fluid flow tube 107 through the connector 203 to the stake and container 101 the ball valve stops the flow of the fluid into the container 101 when it reaches its full capacity. The ball valve base 403 is weighted to provide balance to the ball valve 401. When the ball valve floats up to the top of the stake due to the force of the fluid surface 400 the ball valve guide 402 will enter the inlet fluid receiver 108 which will result in the reduction of the flowing fluid that is coming from inlet flow tube 107 and the ball valve will stop the fluid flow into the container 101. Note that the shape of the ball valve guide 402 and the inlet flow receiver 108 are constructed to facilitate direct and easy fitting of the ball valve guide 402 into the inlet flow receiver 108.

Figure 7:
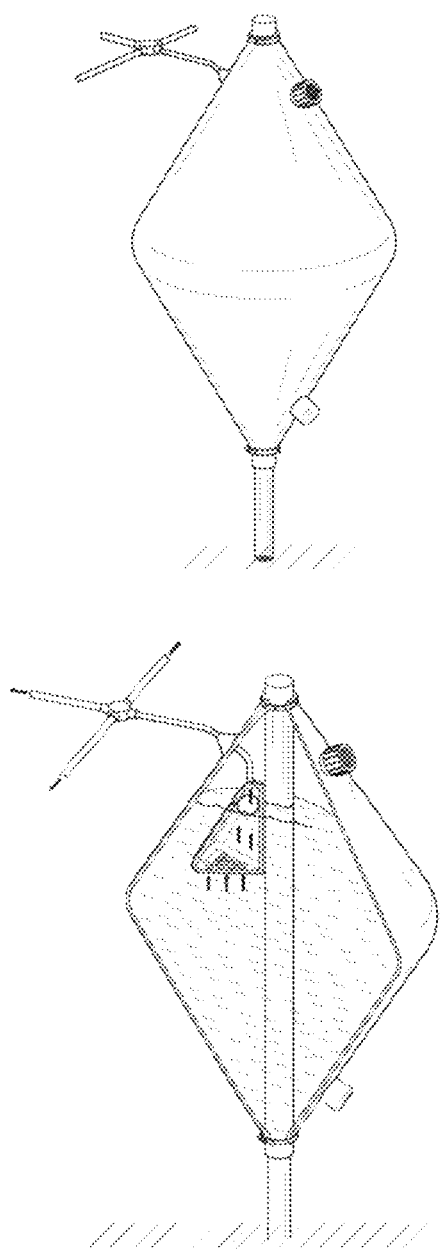
FIG. 7 shows the original patented plant irrigation device embodiment along side the proposed modified device embodiment, showing a perspective view of 2 plant irrigation system embodiment; and a cut-away view of 2 plant irrigation embodiments.
Figure 7:
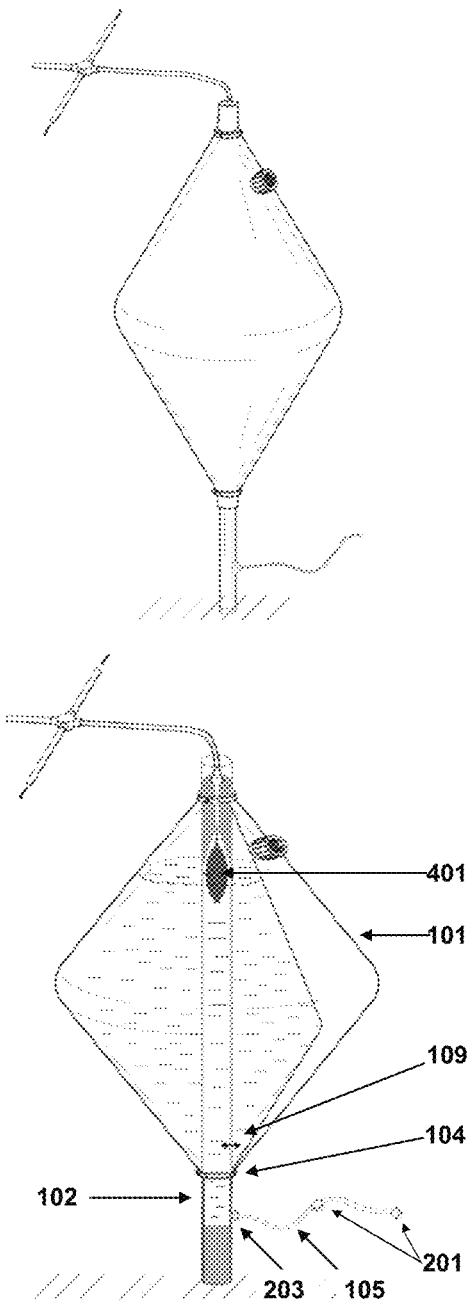

FIG. 7 This is a modified design for the patent number (U.S. Pat. No. 9,968,038). Modification 1 moves the ball valve from outside of the stake to inside the stake. This will make the ball valve 401 more stable and keep it in place more securely. Modification 2 relocates the fluid outlet flow valve at the bottom of the container, above the bottom retaining clip 104, and relocates the valve 201 to the flexible outlet flow tube 105 which ii connected to the stake 102 via the connector 203, underneath the container 101 and the bottom retaining clips 104. Using a flexible outlet flow tube 105 allows for the placement of multiple outlet valves 201 instead of just me and enables fluid to be released near multiple plants. Modification 3 changes to a substantially solid stake to a hollow stake 102 to allow for the ball valve 401 to be placed inside it and the bottom portion of the hollow stake 102, under the connector 203 and flexible outlet flow tube 105, is blocked with a barrier to prohibit any fluid from flowing downward into the bottom portion of the stake 102. Modification 4 adds an hole (opening 109 in a lower portion of the hollow stake 102, located inside the container 101, above the bottom retaining clip 104.

The invention claimed is:

1. A plant irrigation device comprised of; a flexible container adapted to store fluid, the flexible container having a top and a bottom; a stake that extends through the top and the bottom of the flexible container, the stake having an upper end extending above the top of the flexible container and a lower end extending below the bottom of the flexible container, the stake being hollow from the upper end to a side-discharging stake hole located inside the flexible container, the upper end of the stake being open to form an inlet flow receiver for receiving a supply of irrigating fluid, wherein irrigating fluid flowing through the stake in a downstream direction enters the flexible container through the stake hole, the lower end of the stake is configured to be inserted near a plant to be irrigated; the top of the flexible container is sealed to the stake adjacent the upper end thereof; the bottom of the flexible container is sealed to the stake adjacent the lower end thereof; an outlet irrigation tube is connected to the stake below the bottom of the container; a float valve is housed within the stake between the inlet flow receiver and the stake hole, wherein the float valve comprises a ball configured to float upon a surface of the fluid within the stake toward and away from the inlet flow receiver, the ball being configured to allow fluid to flow therepast through the stake when separated from the inlet flow receiver, the ball including an elongated ball guide adapted to enter the inlet flow receiver as the ball floats toward the inlet flow receiver.

2. The plant irrigation device of claim 1, wherein multiple devices can be connected together with each device being independently attached to a fluid flow network configured to add fluid to each device.

3. The plant irrigation device of claim 1, wherein the flexible container has a top area adjacent the top and a bottom area adjacent the bottom, the top and bottom areas of the flexible container each have substantially conical configurations.

4. The plant irrigation device of claim 3, further including a top retaining clip is adjacent to the substantially conical configuration of the top area, and a bottom retaining clip is adjacent to the substantially conical configuration of the bottom area.

5. The plant irrigation device of claim 1, wherein the irrigation fluid in the flexible container includes a combination of water and fertilizer.

6. A method for watering a plant with irrigating fluid, the method comprising: providing the plant irrigation device as claimed in claim 1; inserting the lower end of the stake near a plant; directing a flow of irrigating fluid into the upper end of the stake, allowing the irrigating fluid to pass in the downstream direction through the inlet flow receiver, directing the irrigating fluid in a downstream direction through the stake and around the ball as the ball is separated from the inlet flow receiver, filling the flexible container with the irrigating fluid through the stake hole, floating the ball toward the inlet flow receiver concurrently with said filling step, arresting the flow of irrigating fluid through the stake when the ball floats into the inlet flow receiver; and releasing the irrigating fluid from the outlet irrigation tube above the ground area near the desired plants.

* * * * *